US006587314B1

(12) United States Patent
Lille (10) Patent No.: US 6,587,314 B1
(45) Date of Patent: Jul. 1, 2003

(54) ENHANCED SILICON AND CERAMIC MAGNETORESISTIVE READ/WRITE HEAD AND A METHOD FOR PRODUCING THE SAME

(75) Inventor: Jeffrey S. Lille, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/572,025

(22) Filed: May 16, 2000

(51) Int. Cl.[7] .............................. G11B 5/39; G11B 5/60; G11B 21/21
(52) U.S. Cl. ................. 360/313; 360/234.4; 360/234.7; 360/235.1
(58) Field of Search ........................... 360/234.3, 234.4, 360/234.7, 234.8, 235.1, 235.3, 313, 323, 317

(56) References Cited

U.S. PATENT DOCUMENTS

| | | | |
|---|---|---|---|
| 5,184,393 A | | 2/1993 | Saito et al. |
| 5,215,608 A | * | 6/1993 | Stroud et al. ............... 156/64 |
| 5,359,479 A | | 10/1994 | Karam, II |
| 5,421,943 A | | 6/1995 | Tam et al. |
| 5,559,051 A | | 9/1996 | Voldman et al. |
| 5,587,857 A | | 12/1996 | Voldman et al. |
| 5,712,747 A | | 1/1998 | Voldman et al. |
| 5,734,519 A | * | 3/1998 | Fontana et al. ......... 360/97.01 |
| 5,757,591 A | | 5/1998 | Carr et al. |
| 5,771,571 A | | 6/1998 | Voldman et al. |
| 5,867,888 A | | 2/1999 | Voldman et al. |

FOREIGN PATENT DOCUMENTS

| | | |
|---|---|---|
| JP | 51-29119 | 3/1976 |
| JP | 54-148515 | 11/1979 |
| JP | 63-129515 | 6/1988 |
| JP | 2-240818 | 9/1990 |
| JP | 4-153909 | 5/1992 |
| JP | 60-239909 | 11/1995 |
| JP | 10-124839 | 5/1998 |

* cited by examiner

Primary Examiner—David L. Ometz
(74) Attorney, Agent, or Firm—Altera Law Group, LLC (57) ABSTRACT

An enhanced silicon and ceramic magnetoresistive read/write head and method for making the same is disclosed. The present invention provides reliable chemical mechanical polish etch stop by etching deep trenches into the silicon at the surrounding edges of the magnetic write and read device and filling it with a refractory metal (e.g. tungsten) so that the silicon wafer thickness will not significantly add to the length of the ABS nor to the gram load of the slider. An imbedded deformable pad will allow these bonded heads to have a high average fly height and reduce to near contact recording when reading and writing through an applied potential across a deformable pad in the silicon. The epoxy bond of the silicon to the ceramic slider consists of polymethyl methracrylate (PMMA) which can be spun on a wafer or a row of wafers with nanometer thickness repeatability and using low temperatures, i.e., <200° C.

34 Claims, 10 Drawing Sheets

ENHANCED SILICON AND CERAMIC MAGNETORESISTIVE READ/WRITE HEAD AND A METHOD FOR PRODUCING THE SAME

BACKGROUND OF THE INVENTION

1. Field of the Invention

This invention relates in general to thin film electromagnetic flying head assemblies and methods for making same, and more particularly to an enhanced silicon and ceramic magnetoresistive read/write head and a method for producing the same.

2. Description of Related Art

Disk drive systems are widely used to store data and software for computer systems. A disk drive system generally includes a disk storage media mounted on a spindle such that the disk can rotate thereby permitting an electromagnetic head mounted on a movable arm to read and write information thereon. Data read/write operations are performed by positioning the head to a selected radial position on the surface of the rotating disk. A head reads or writes data by detecting or creating magnetized regions on the platter coating, respectively.

The electromagnetic head for a disk drive system is usually mounted in a carrier called a "slider." The slider serves to support the head and any electrical connections between the head and the rest of the disk drive system. The slider maintains a uniform distance from the surface of the rotating disk to prevent the head from undesirably contacting the disk. This is accomplished by incorporating aerodynamic features into the slider that causes the slider to glide above the disk surface over the moving air.

Computer users are constantly demanding greater data-storage capacity. Thus, disk drive makers are forever trying to increase the storage capacity of their products. In the process, they are also constantly trying to minimize the actual, physical size of those drives. The accomplishment of these goals requires both shrinking the spacing of the tracks so that more data can fit on a disk squeezing bits more closely together on the tracks, and reducing the distance between the head and disk. Thus, disk drive manufacturers must develop heads that record narrower tracks and fly at a reduced spacing.

In regards to the reduced spacing, the magnetic field pattern around the gap in the head spreads and weakens very rapidly with distance away from the gap. Because the relevant distance is from the gap to the magnetizable platter coating, the design must include both the air gap (the actual height at which the head flies above the upper surface of the platter) and the thickness of any protective or lubricating overcoating that may have been applied to the platter or head. Thus, disk drive manufacturers must develop ways of minimizing the height at which the head flies above the disk surface while providing cost effective manufacturing techniques.

Typically, a magnetic head may be disposed on a titanium carbide ceramic slider body. On the trailing edge of the magnetic head a magnetic sensor is formed on the edge. This surface is coated with alumina insulator followed by a permalloy shield made of nickel and iron. Each of the critical elements of a magnetic head becomes more susceptible to destruction by electrostatic discharge as the dimensions are reduced. Nevertheless, any electrostatic discharge protection may be common to a variety of magnetic head designs.

One method of providing additional circuitry, such as electrostatic discharge protection circuits, to a magnetic head assembly is by combining a magnetic head assembly with a silicon chip. In this manner, the slider/head design may be selected independently of the type of silicon chip that provides additional circuitry. However, providing additional circuitry via the silicon chip adds space to the limited area on a head. Accordingly, disk drive manufacturers must search for ways to improve the fabrication of magnetic heads. In addition, the possibility of having a head that has a flexible/deformable layer can introduce the ability of the head to decrease the fly height of the head.

Thus, it can be seen that there is a need for an enhanced silicon and ceramic magnetoresistive read/write head and a method for producing the same.

SUMMARY OF THE INVENTION

To overcome the limitations in the prior art described above, and to overcome other limitations that will become apparent upon reading and understanding the present specification, the present invention discloses an enhanced silicon and ceramic magnetoresistive read/write head and a method for producing the same.

The present invention solves the above-described problems by providing a using a low temperature (<200° C.) epoxy or polymethyl methracrylate (PMMA) bonding to provide slider length repeatability, maintain the gram load of the head and minimize alteration in the finished head. An etch stop material is deposited or a sacrificial layer is embedded in the silicon chip to allow precise removal of unwanted silicon to ensure the silicon wafer thickness does not add to the length of the ABS or to the gram load of the slider. A deformable layer or device is deposited adjacent the silicon wafer to allow a higher average fly height while providing near contact reading and writing when the layer or device is deformed.

A method in accordance with the principles of the present invention includes providing a silicon wafer which has a pair of oppositely facing substantially flat faces, fabricating one or more devices on the silicon wafer, etching at least one trench in the silicon in a first of the oppositely facing substantially flat faces, depositing a hard, polishing-resistant material in the at least one trench to form at least one etch stop, polishing the silicon wafer from a second of the oppositely facing substantially flat faces until an etch stop is encountered and coupling the first of the oppositely facing substantially flat faces of the silicon wafer to a slider body.

Other embodiments of a method in accordance with the principles of the invention may include alternative or optional additional aspects. One such aspect of the present invention is that the coupling further comprises bonding the silicon wafer to the slider body using a low temperature bonding material.

Another aspect of the present invention is that the bonding material is spun on the silicon wafer or the slider body.

Another aspect of the present invention is that the bonding material comprises an epoxy.

Another aspect of the present invention is that the bonding material comprises polymethyl methracrylate.

Another aspect of the present invention is that the silicon circuit device comprises an electrostatic discharge protection device.

Another aspect of the present invention is that the silicon circuit device comprises an a magneto-resistive element.

Another aspect of the present invention is that the hard, polish-resistant material comprises tungsten.

Another aspect of the present invention is that the hard, polish-resistant material comprises tantalum.

Another aspect of the present invention is that the method further includes probing at least one etch stop to determined the amount of silicon that has been removed and continuing to polish the silicon wafer until a predetermined amount of silicon has been removed.

Another aspect of the present invention is that the method further includes probing at least one etch stop to determined the resistance of at least one etch stop and continuing to polish the silicon wafer until the at least one etch stop has a predetermined resistance or thickness.

Another aspect of the present invention is that the method further includes forming a deformable layer over the first of the oppositely facing substantially flat faces of the silicon wafer prior to bonding.

Another aspect of the present invention is that the deformable layer is selectably excitable to cause the deformable layer to deform, the expansion torqueing the silicon wafer and silicon circuit devices toward a disk surface.

Another aspect of the present invention is that the deformable layer provides a high average fly height for the head and reduces the fly height to near contact when an electromagnetic device is activated.

Another embodiment of the present invention includes an enhanced silicon and ceramic magnetoresistive read/write head, the head including a silicon wafer having a pair of oppositely facing substantially flat faces and one or more devices on the silicon wafer, at least one etch stop imbedded in a first of the oppositely facing substantially flat faces of the silicon wafer for determining the thickness of the silicon wafer and a slider body coupled to a second of the oppositely facing substantially flat faces the silicon wafer.

Another embodiment of the present invention includes a disk drive system, the disk drive including a magnetic storage disk for storing data thereon, a MR head located proximate to the disk for reading and writing data to and from the disk, a disk movement device, coupled to the disk, for rotating the disk, an actuator arm, coupled to the MR head, for supporting the MR head and an actuator, coupled to the access arm, for moving actuator arm to position the MR head relative to the disk; wherein the MR head further includes a silicon wafer having a pair of oppositely facing substantially flat faces and one or more devices on the silicon wafer, at least one etch stop imbedded in a first of the oppositely facing substantially flat faces of the silicon wafer for determining the thickness of the silicon wafer and a slider body coupled to a second of the oppositely facing substantially flat faces to the silicon wafer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an enhanced silicon and ceramic magnetoresistive read/write head and a method for producing the same. The present invention uses a low temperature (<200° C.) epoxy or polymethyl methracrylate (PMMA) bonding to provide nanometer thickness repeatability, maintain the gram load of the head and minimize alteration in the finished head. Etch stop material is deposited in the silicon chip to allow precise removal of unwanted silicon to ensure the silicon wafer thickness does not add to the length of the ABS or to the gram load of the slider. A deformable band, such as a deformable layer or a thermo-mechanical layer, is provide adjacent the silicon wafer to allow a higher average fly height while providing near contact reading and writing.

Figure 1:
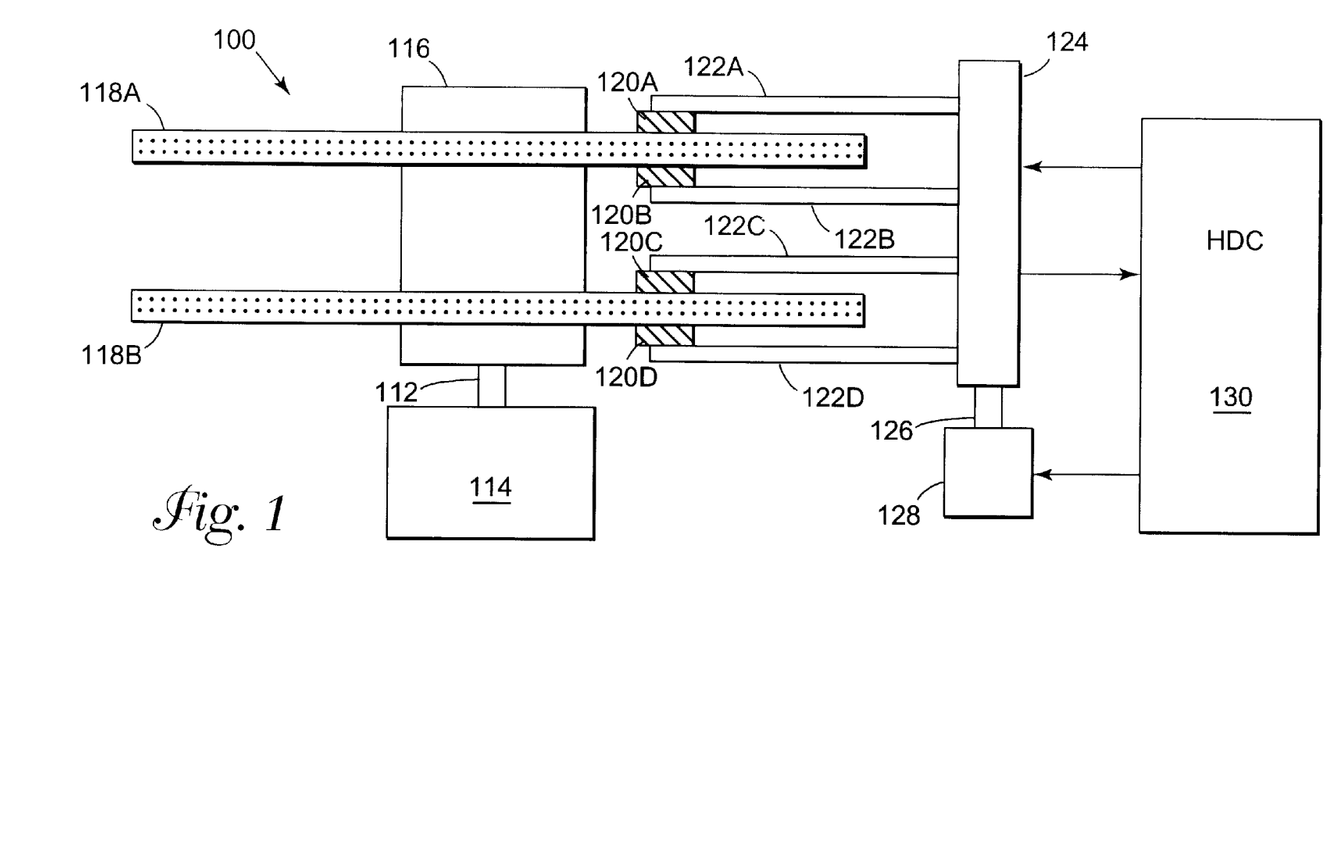
FIG. 1 illustrates a hard disk drive (HDD) according to the present invention.

FIG. 1 illustrates a hard disk drive (HDD) 100 including disks 118A, 118B according to the present invention. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that the their axes are in coincidence. One or more information recording disks 118A and 118B are mounted between support 116. Magnetic heads 120A, 120B, 120C and 120D are respectively provided to face the disk surface, and these magnetic heads are supported from an actuator 124 by access arms 122A, 122B, 122C, and 122D, respectively. The individual magnetic heads 120A to 120D receive the drive force transmitted from an actuator drive device 128 by a shaft 126 and rotates about the shaft 126 as the axis of rotation, and fly over the disk 118 to a predetermined position.

Figure 2:
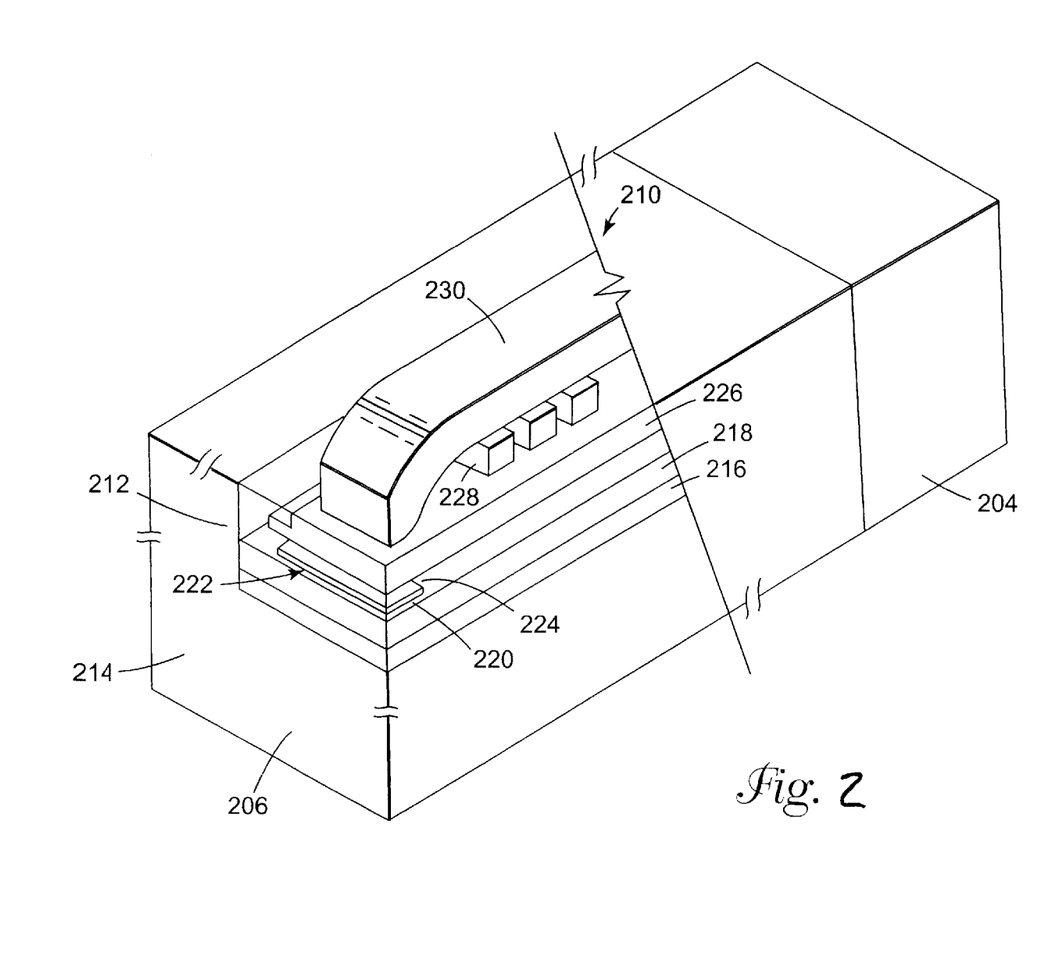
FIG. 2 illustrates a cross-section view of an inductive-write, magnetic-read head and slider body combination.

FIG. 2 illustrates a cross-section view 210 of an inductive-write, magnetic-read head 212 and slider body 214 combination. In addition, FIG. 2 illustrates a silicon chip 204 coupled to the slider body oppositely from the air bearing surface 206. Those skilled in the art will recognize that the invention is not meant to be limited to the particular magnetic head described herein. Other magnetic heads may be fabricated with departing from the scope of the invention.

The head 212 may be constructed on a titanium carbide slider body 214, or alternatively on a silicon slider body. For purposes of example, a titanium carbide slider body will be discussed herein. However, those skilled in the art will recognize that the invention is not meant to be limited to a particular type of slider body composition.

First, a TiC wafer 214 is defined. An insulating film 216 is deposited on the TiC wafer 214. The insulating film 216 is typically alumina. A first shield film 218 is deposited for the first shield definition. The first shield 218 is typically a permalloy material such as nickel/iron alloy. This serves as a magnetic shield which prevents the magnetic field from distorting the field associated with the information being read.

A first dielectric film 220 is placed over the first shield 218. A magnetoresistive film 222 is deposited to define the magnetoresistive sensor element. A second dielectric film 224 is then deposited. A second shield film 226 is deposited on dielectric film 224 for a second shield definition. Again, the shield is typically a permalloy material such as nickel/iron alloy. Thus, the dielectric films 220, 224 prevent the MR sensor element 222 from coming into direct electrical contact with either the first 218 or second 226 shield. The second shield 226 also serves as a magnetic shield which prevents the magnetic field from distorting the field associated with the information being read. However, those skilled in the art will recognize that unshielded structures may also be constructed without departing from the teaching of the present invention.

The standard MR head 212 may be integrated with the inductive head by using the second MR shield 226 as the yoke of the inductive head. Then an inductive coil 228 may be defined around a second inductive pole piece 230.

Figure 3:
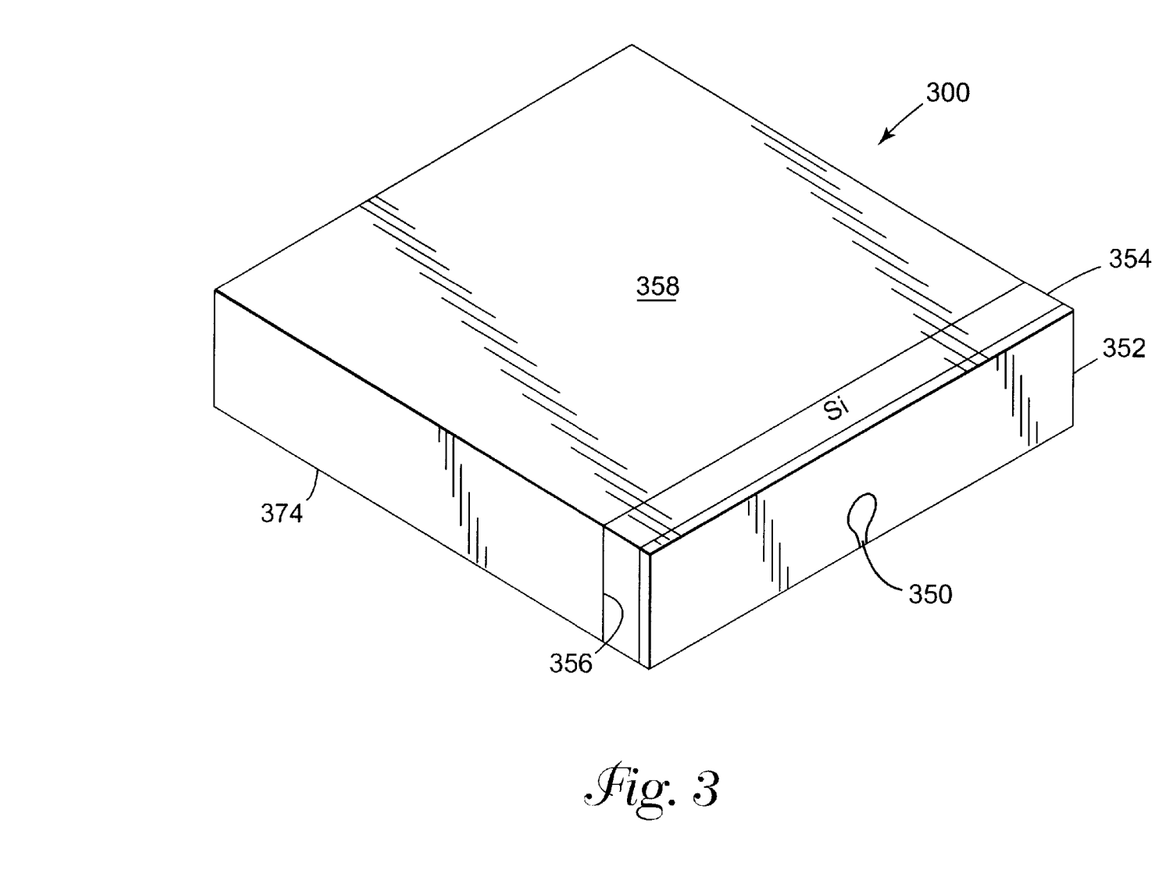
FIG. 3 is an illustration of a composite slider/head structure according to the present invention.

FIG. 3 is an illustration of a composite slider/head structure 300 according to the present invention. The MR head 350 is shown mounted on the trailing edge 356 of the silicon chip 354 which, in turn, is mounted on the trailing edge 356 of the slider 358. The ABS, which is shown at 374, is formed by the bottom surface of the MR head 350, the silicon chip 354 and the slider 358. While the description describes a single MR head carried by the slider, it should be understood that the slider may carry a plurality of MR heads according to the teachings of the present invention.

The present invention provides an enhanced silicon and ceramic magnetoresistive read/write head and method for producing the same. Producing magnetoresistive write/read heads on silicon has an advantage in ESD protection during fabrication of the head. Attaching the processed head to a ceramic slider completes the structure of the magnetoresistive head. U.S. Pat. No. 5,559,051, issued Sep. 24, 1996, to Voldman et al., entitled PROCESS FOR MANUFACTURING A SILICON CHIP WITH AN INTEGRATED MAGNETORESISTIVE HEAD MOUNTED ON A SLIDER", which is assigned to International Business Machines Corporation, is incorporated herein by reference and discloses a method for manufacturing a silicon chip on a ceramic slider. Nevertheless, the present invention provides improvements of a low temperature bonding material to attach the head to the ceramic slider along with fabricated chemical mechanical etch stops in the silicon that make such heads more compatible with existing MR head slider fabrication. Moreover, the addition of a deformable material, such as a piezoelectric or thermo-mechanical layer, will allow this head to have a higher fly height, and thus fewer thermal asperities with the hard disk.

Figure 4A:
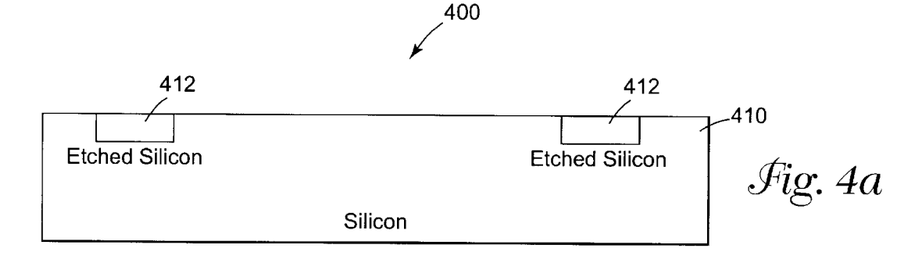
FIGS. 4a–d illustrate the process of a forming lead and/or etch stop features in the silicon wafer according to the present invention.
Figure 4B:
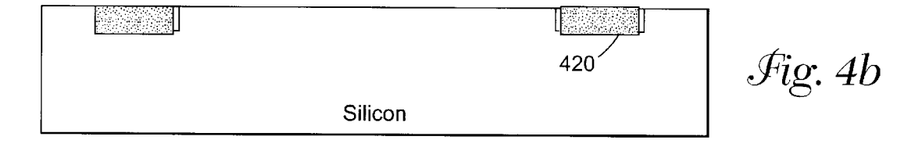

FIGS. 4a–d illustrate the process 400 of a forming lead and/or etch stop features in the silicon wafer according to the present invention. First, FIG. 4a shows a silicon wafer 410 that is etched with multiple trenches 412. Each of the trenches 412 may be at least several microns wide. Next, FIG. 4b shows a hard, polishing resistant material 420 is deposited (e.g. tungsten or tantalum). The silicon wafer is then polished down to the point where only metal in the trenches is remaining on the wafer. The wafer is now ready for read and write structure deposition.

Figure 4C:
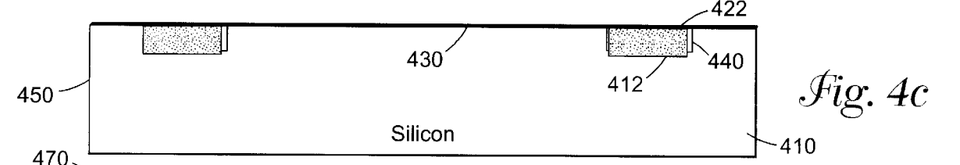

FIG. 4c shows the deposition of the read and write structure 430 over the silicon and hard, polishing resistant material 420. After the read and write structure is built, a spun on polymer or spun-on glass 422 is applied to assist in planarizing the surface. Once this material is in-laid into the silicon 410, the magnetoresistive read element 430 is electrically connected to the leads 440 on the silicon. The leads 440 of the MR structure are coupled to the hard, polish resistant material 420 in filled trenches 412. The hard, polish resistant material 420 acts as in-situ polish etch stop material. The wafer 450 is then ready for bonding to a ceramic slider. The bonding of the wafer 450 is not illustrated in FIGS. 4a–d (See FIG. 5).

Figure 4D:
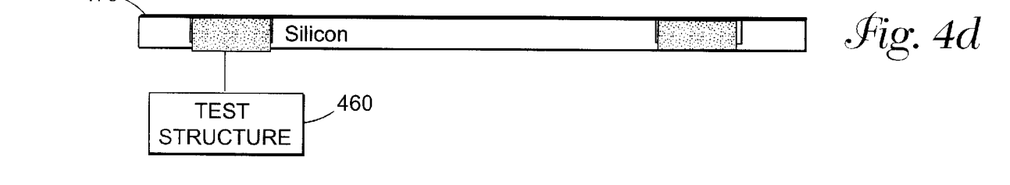

FIG. 4d shows the silicon 410 subsequently being polished down to the hard, polish-resistant material forming in-laid etch stops 420. The polishing of the silicon 410 may be performed according the method described in U.S. Pat. No. 5,659,492, issued Aug. 19, 1997 to Leping et al, entitled "CHEMICAL MECHANICAL POLISHING ENDPOINT PROCESS CONTROL", which is assigned to International Business Machines Corporation, and which is incorporated by reference herein. U.S. Pat. No. 5,659,492 discloses a method and apparatus are provided for determining the endpoint for chemical mechanical polishing a film on a wafer.

Once this endpoint 420 is detected on the back side of the bonded silicon head 450 (or rows of a wafer), an over-etch can be designed to reduce the resistance of the leads protruding through the back of the silicon to make external electrical connections. Since these etch stops 420 are electrically connected to the read and write elements 430, it is possible to control the amount of fine polishing and thus the final thickness of the silicon on the back end of the slider. This will reduce the resistance of the leads 440 that are attached to the read/write head 430. Another possibility is to have test structures 460 that can be probed to see the change in resistance of the leads 440 and etch stops 420. Alternatively, the test structures 460 may probed the etch stops 420 to determined the amount of silicon that has been removed. The back 470 of the silicon wafer 450 will become the back of the ceramic slider where the lead wires will be attached.

Figure 5:
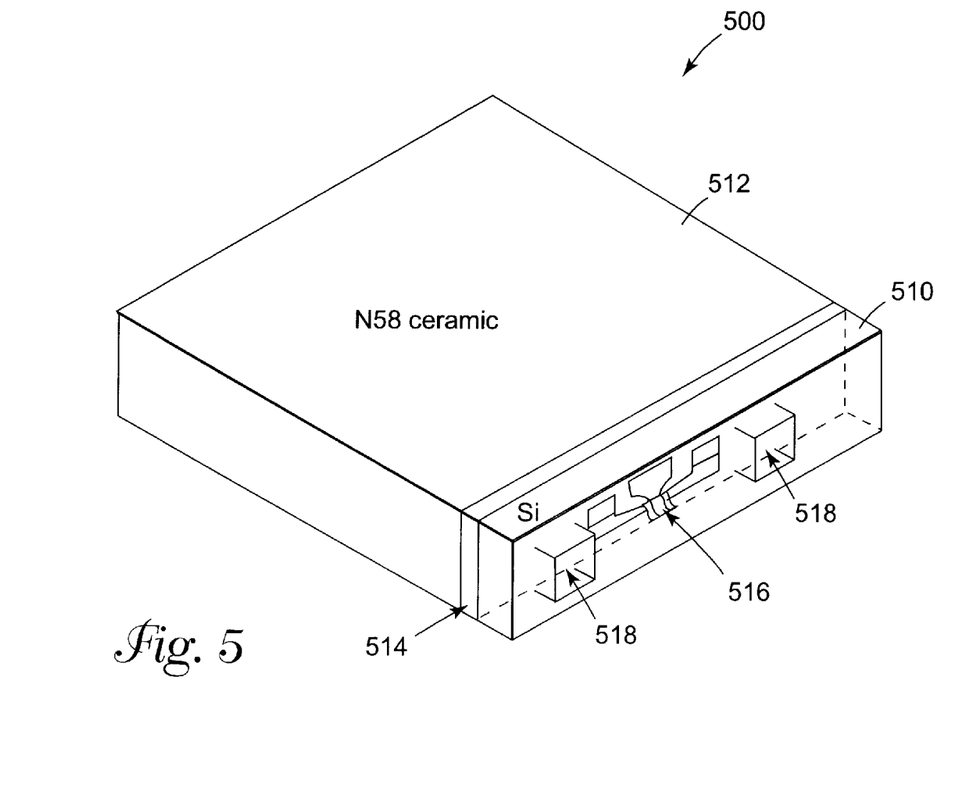
FIG. 5 illustrates an enhanced silicon and ceramic magnetoresistive read/write head according to the present invention.

FIG. 5 illustrates an enhanced silicon and ceramic magnetoresistive read/write head 500 according to the present invention. In FIG. 5, the fabricated silicon wafer 510 is bonded to a ceramic slider 512. The bond material 514 is shown between the fabricated silicon wafer 510 and the ceramic slider 512. The MR read and write head 516 is shown on the silicon wafer 510. In-laid etch stops 518 in the silicon wafer 510 determine the endpoint for chemical mechanical polishing.

The bond material 514 is spun-on epoxy or polymethyl methracrylate (PMMA). Those skilled in the art will recognize and understand the process for spinning on PMMA 514. The PMMA 514 will produce a strong, low stress bond that should attach the two materials with little outgassing once the PMMA 514 is cured. The bonding temperature is kept low to minimize alteration in the finished MR read/write head (i.e. interlayer diffusion). Current technology allows one to reliably bond flat wafers below 200° C. with a sub-micron thickness with almost zero film stress. The use of the low temperature epoxy or polymethyl methracrylate (PMMA) 514 along with polishing will give the combined silicon/ceramic structure 500 the same gram load as existing ceramic sliders, while enhancing the ability to read and write on a magnetic disk through additional fabrication of structures on to the silicon 510.

Figure 6:
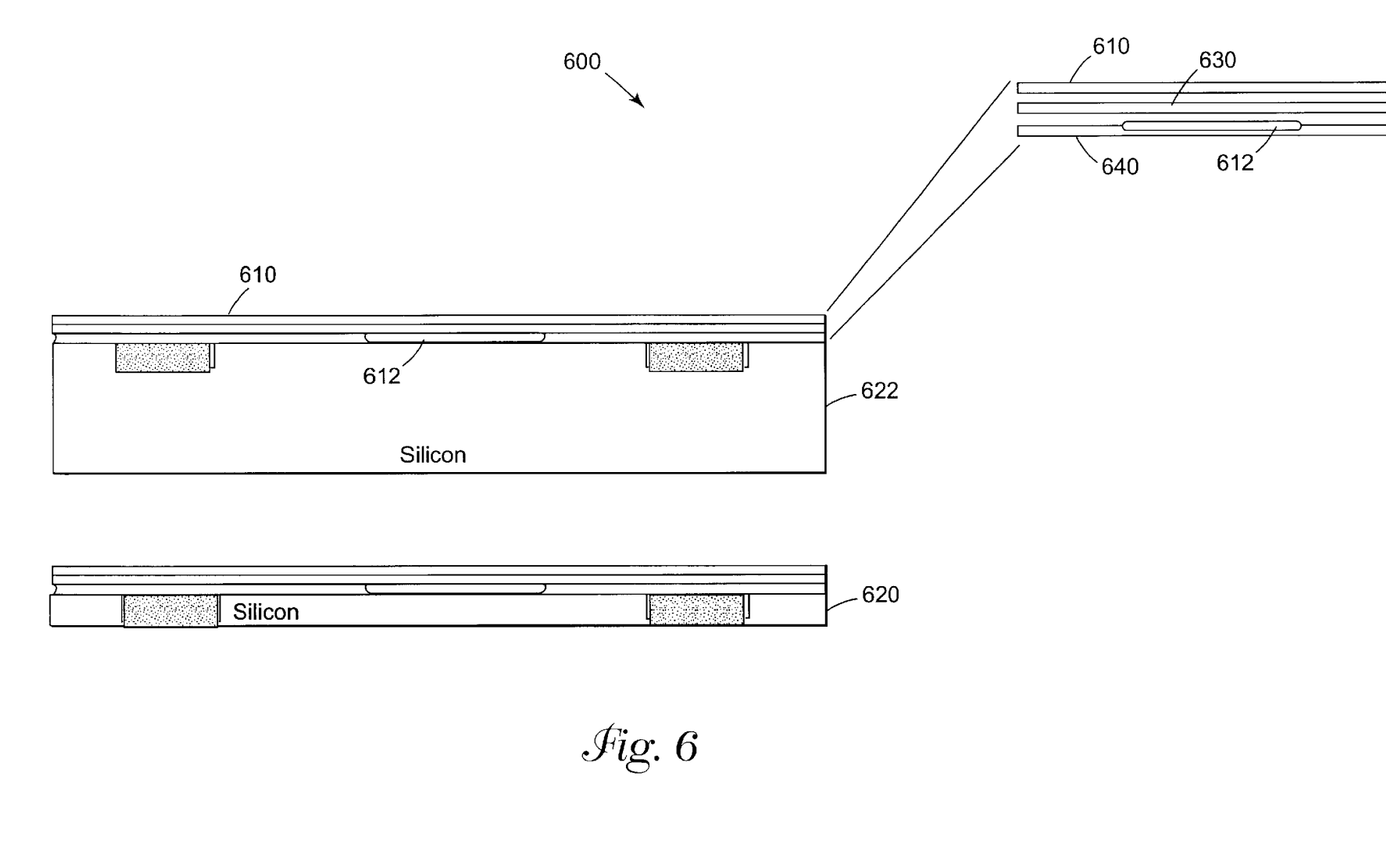
FIG. 6 illustrates a head having a deformable layer above the read/write head according to the present invention.

FIG. 6 illustrates a head 600 having a deformable layer 610 above the read/write head 612 according to the present invention. In FIG. 6, a polished 620 and unpolished 622 silicon wafer are shown. A conducting layer 630 is deposited between the insulating material 640 and the deformable layer 610. The conducting layer 630 is biased to create an electric field across the deformable layer 610 to the grounded ceramic substrate (not shown in FIG. 6). The deformable layer 610 will allow the slider to bend or sheer the read and write elements 612 toward the hard disk surface, hence temporarily reducing the physical and magnetic spacing between the head and the disk.

Figure 7:
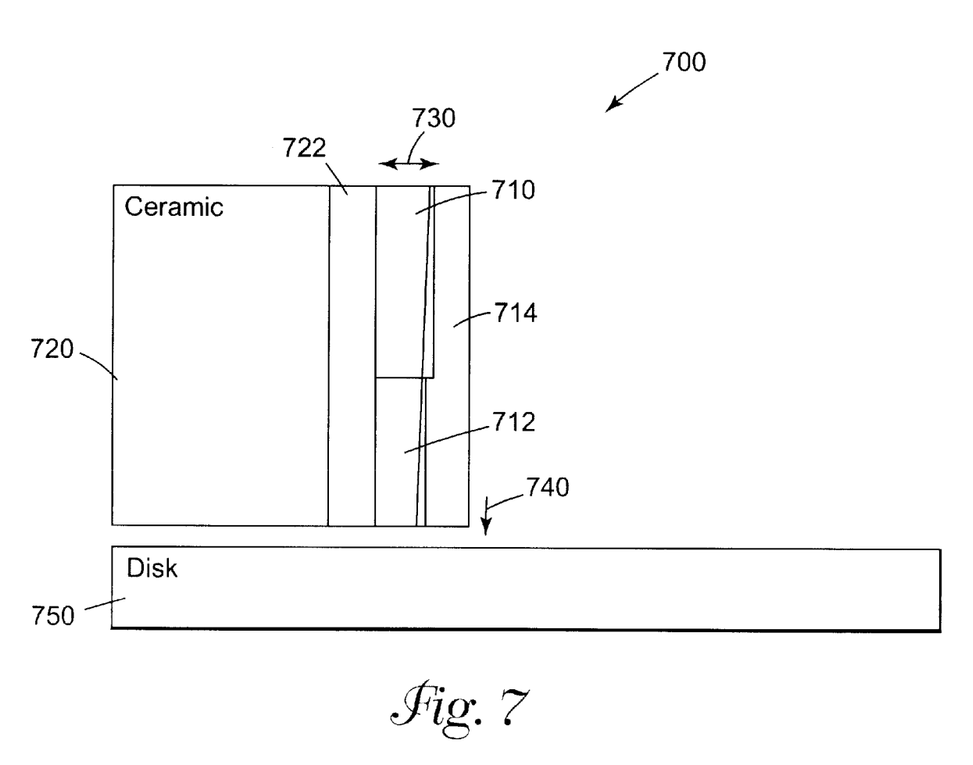
FIG. 7 illustrates the operation of the deformable layer according to the present invention.

FIG. 7 illustrates the operation 700 of the deformable layer 710 according to the present invention. In FIG. 7, the silicon wafer 714 is shown coupled to the ceramic slider 720 via bonding material 722. The deformable layer 710 is subjected to an electric field between the read/write head element 712 and the grounded ceramic slider 720. This electric field will be created when the read/write head element 712 is excited which will cause the deformable layer to deform 730 (e.g., at approximately 0.6 nm/V for lead zirconate titanate) hence torqueing the read/write head element 712 of the silicon wafer 714 closer 740 to the hard disk 750. An external voltage may be applied to the at the same time the read or write head 712 is activated to stress the deformable layer 710 which will require an extra wire to be connected to the head 712. This electric field can also be applied during reading to assist in the measuring the field off the disk 750. These additional layers 610, 630 are illustrated in FIG. 6.

Figure 8:
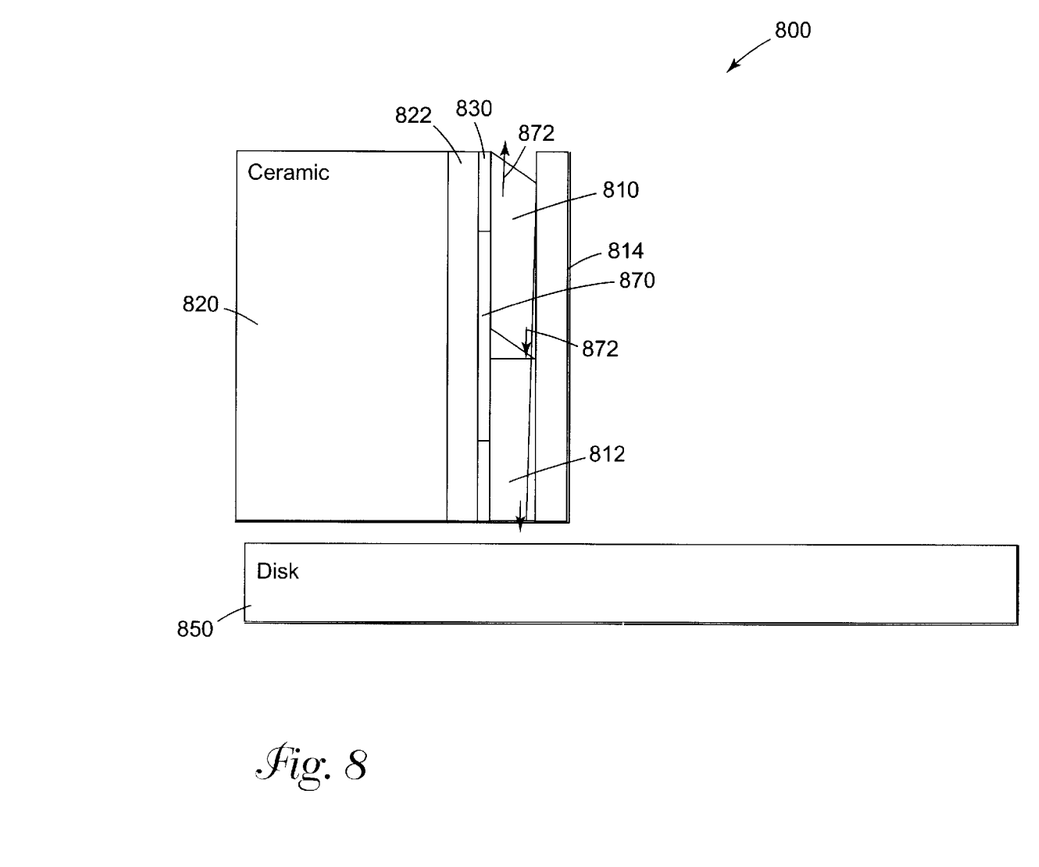
FIG. 8 illustrates another method for biasing the deformable layer according to the present invention.

FIG. 8 illustrates another method 800 for biasing the deformable layer 810, according to the present invention. In FIG. 8, the silicon wafer 814 is shown coupled to the ceramic slider 820 via bonding material 822. A patterned insulating layer 870 is deposited on top of the deformable layer 810. A conducting layer 830 is deposited between the insulating material 870 and the deformable layer 810. By placing a relatively thick insulating layer 870 on the bottom portion of the deformable layer 810, the induced electric field across the deformable material 810 will be slanted 872 (or not parallel with the ABS). This will induce a sheering force on the deformable material 872 that will push the silicon wafer 814 (with the read/write element 812) toward the disk surface 850. The additional conducting layer 830 on the deformable layer 810 will have a rough or textured surface so to insure that the deformable layer 810 is in contact with the ceramic slider 820.

Figure 9:
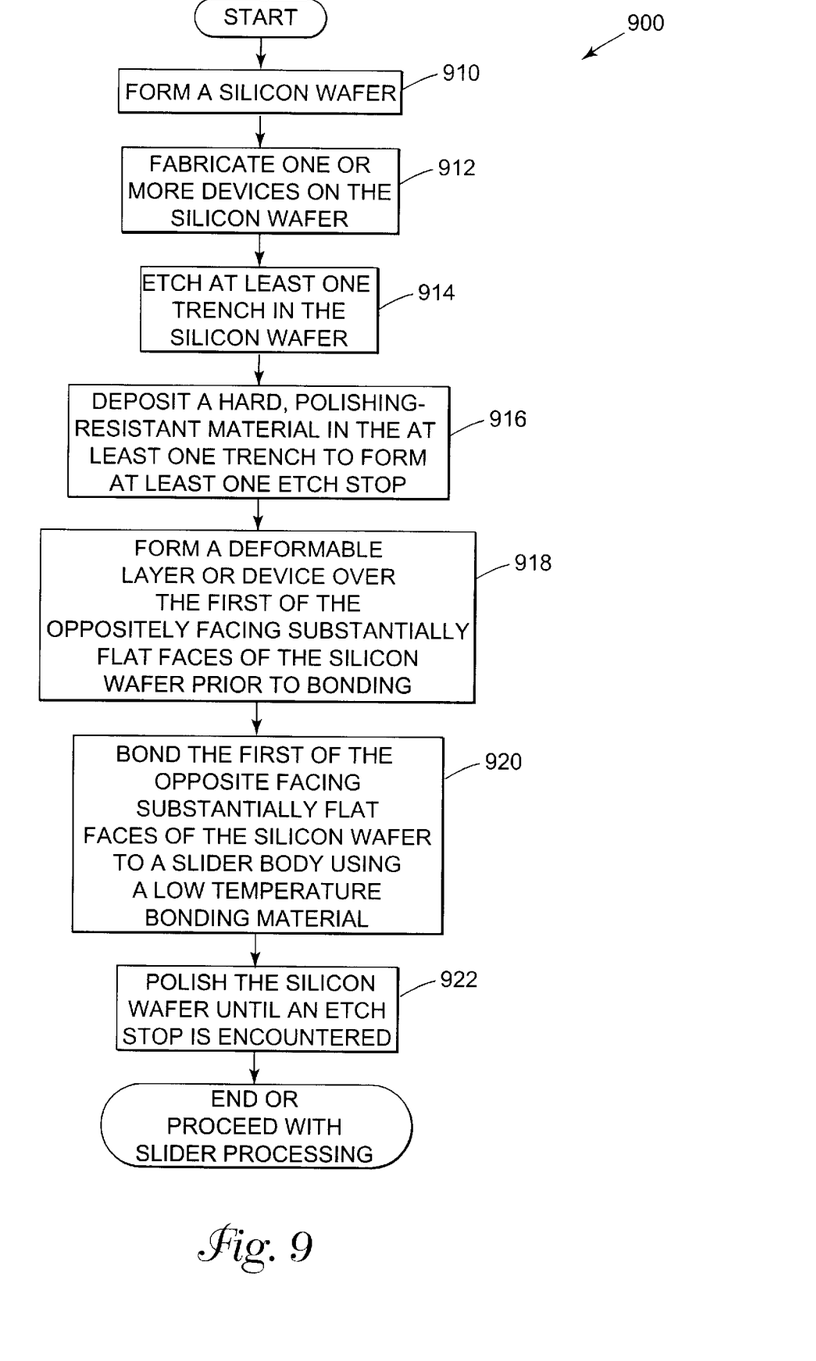
FIG. 9 illustrates a flow chart illustrating one method embodiment for making an enhanced silicon and ceramic magnetoresistive read/write head according to the present invention.

FIG. 9 illustrates a flow chart illustrating one method embodiment for making an enhanced silicon and ceramic magnetoresistive read/write head according to the present invention. A silicon wafer which has a pair of oppositely facing substantially flat faces is provided 910. One or more devices are fabricated on the silicon wafer 912. At least one trench is etched in the silicon in a first of the oppositely facing substantially flat faces 914. A hard, polishing-resistant material is deposited in the at least one trench to form at least one etch stop 916.

A deformable layer may be formed over the first of the oppositely facing substantially flat faces of the silicon wafer prior to bonding 918. The first of the oppositely facing substantially flat faces of the silicon wafer is bonded to a slider body using a low temperature bonding material 920. The silicon wafer is polished on a second of the oppositely facing substantially flat faces until an etch stop is encountered 922. The etch stops may be probed to control the polishing to produce a silicon wafer having a predetermined thickness or to produce etch stops having a predetermined resistance.

The deformable layer is selectably excitable to cause the deformable layer to deform, wherein the expansion torques the silicon wafer and devices toward a disk surface. Thus, the deformable layer provides a high average fly height for the head and reduces the fly height to near contact when a silicon circuit device is activated.

Figure 10:
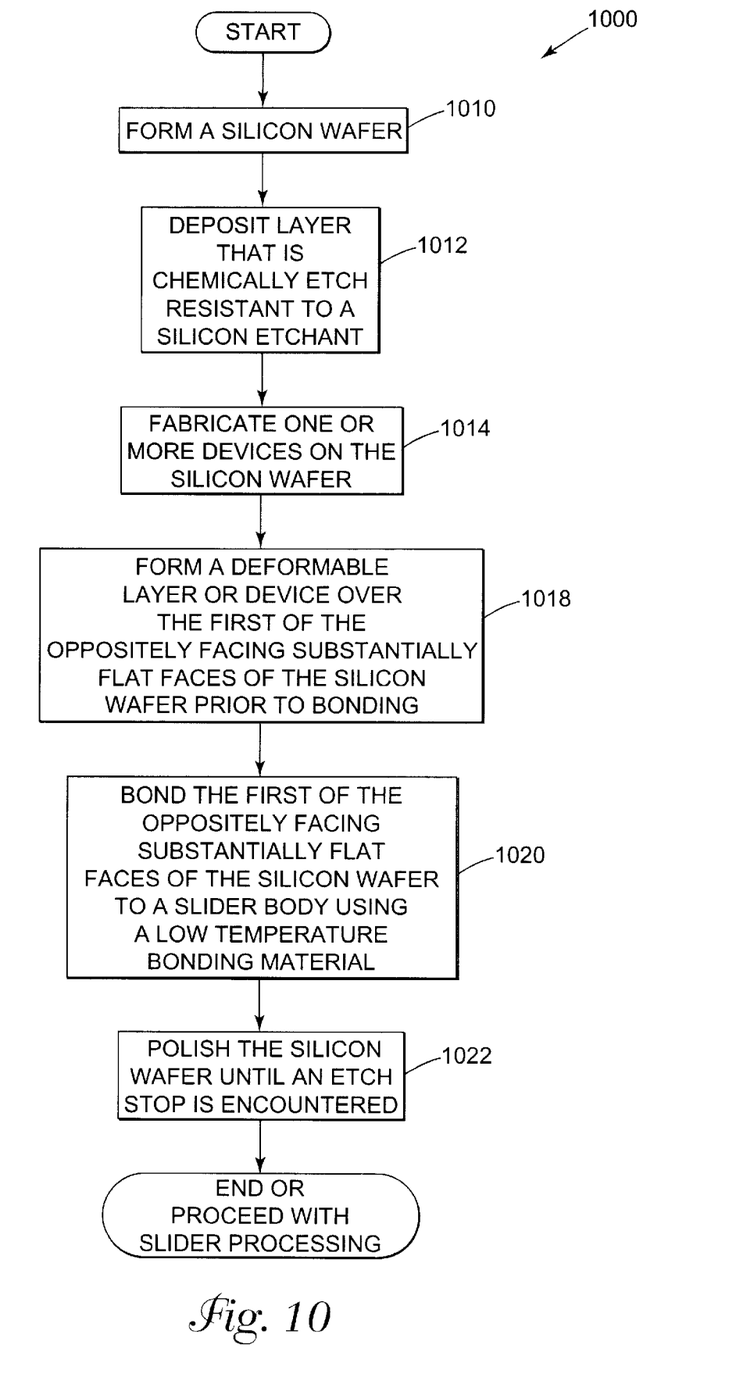
FIG. 10 illustrates a flow chart illustrating a second method embodiment for making an enhanced silicon and ceramic magnetoresistive read/write head according to the present invention.

FIG. 10 illustrates a flow chart illustrating one method embodiment for making an enhanced silicon and ceramic magnetoresistive read/write head according to the present invention. A silicon wafer which has a pair of oppositely facing substantially flat faces is provided 1010. A layer is deposited that is chemically etch resistant to a silicon etchant 1012. One or more devices are fabricated on the silicon wafer 1014.

A deformable layer may be formed over the first of the oppositely facing substantially flat faces of the silicon wafer prior to bonding 1018. The first of the oppositely facing substantially flat faces of the silicon wafer is bonded to a slider body using a low temperature bonding material 1020. The silicon wafer is polished on a second of the oppositely facing substantially flat faces until an etch stop is encountered 1022. The etch stops may be probed to control the polishing to produce a silicon wafer having a predetermined thickness or to produce etch stops having a predetermined resistance.

Again, the deformable layer is selectably excitable to cause the deformable layer to deform, wherein the expansion torques the silicon wafer and devices toward a disk surface. Thus, the deformable layer provides a high average fly height for the head and reduces the fly height to near contact when a silicon circuit device is activated.

In summary, an enhanced silicon and ceramic magnetoresistive read/write head and method for making the same has been described. The present invention provides reliable chemical mechanical polish etch stop by etching deep trenches into the silicon at the surrounding edges of the magnetic write and read device and filling it with a refractory metal (e.g. tungsten) so that the silicon wafer thickness will not significantly add to the length of the ABS nor to the gram load of the slider. An imbedded deformable pad will allow these bonded heads to have a high average fly height and reduce to near contact recording when reading and writing through an applied potential across a deformable pad in the silicon. The epoxy bond of the silicon to the ceramic slider consists of polymethyl methracrylate (PMMA) which can be spun on a wafer or a row of wafers with nanometer thickness repeatability and using low temperatures, i.e., <200° C.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An enhanced silicon and ceramic magnetoresistive read/write head, comprising:
   a silicon wafer having a pair of oppositely facing substantially flat faces and one or more devices on the silicon wafer;
   at least one etch stop imbedded in a first of the oppositely facing substantially flat faces of the silicon wafer for determining a thickness of the silicon wafer; and
   a slider body coupled to the first of the oppositely facing substantially flat faces to the silicon wafer.

2. The head of claim 1 further comprising a low temperature bonding material bonding the silicon wafer to the slider body.

3. The head of claim 2 wherein the bonding material is spun on the silicon wafer or the slider body.

4. The head of claim 2 wherein the bonding material comprises an epoxy.

5. The head of claim 2 wherein the bonding material comprises polymethyl methracrylate.

6. The head of claim 1 wherein the device comprises an electrostatic discharge protection device.

7. The head of claim 1 wherein the device comprises a magneto-resistive element.

8. The head of claim 1 wherein the at least one etch stop comprises a hard, polish-resistant material.

9. The head of claim 8 wherein the hard, polish-resistant material comprises tungsten.

10. The head of claim 8 wherein the hard, polish-resistant material comprises tantalum.

11. The head of claim 8 wherein the hard, polish-resistant material comprises carbon.

12. The head of claim 1 wherein the at least one etch stop provides a measurement of the amount of silicon removed prior to coupling the slider body to the silicon wafer.

13. The head of claim 1 wherein the at least one etch stop has a depth, the depth being determined by probing the at least one etch stop during polishing to determine the resistance of the at least one etch stop and continuing to polish the silicon wafer until the at least one etch stop has a predetermined resistance.

14. The head of claim 1 wherein the at least one etch stop has a depth, the depth being determined by probing the at least one etch stop during polishing to determine the resistance of the at least one etch stop and continuing to polish the silicon wafer until the at least one etch stop has a predetermined thickness.

15. The head of claim 1 further comprising a deformable layer formed over the first of the oppositely facing substantially flat faces of the silicon wafer prior to bonding the silicon wafer to the slider body.

16. The head of claim 15 wherein the deformable layer is selectably excitable to cause the deformable layer to expand, the expansion torqueing the silicon wafer and devices toward a disk surface.

17. The head of claim 16 wherein the deformable layer provides a high average fly height for the head and reduces the fly height to near contact when a device is activated.

18. A disk drive system, comprising:
    a magnetic storage disk for storing data thereon;
    a magneto-resistive head located proximate to the disk for reading and writing data to and from the disk;
    a disk movement device, coupled to the disk, for rotating the disk;
    an actuator arm, coupled to the MR head, for supporting the MR head; and
    an actuator, coupled to the access arm, for moving actuator arm to position the MR head relative to the disk;
    wherein the MR head further comprises:
      a silicon wafer having a pair of oppositely facing substantially flat faces and one or more devices on the silicon wafer;
      at least one etch stop imbedded in a first of the oppositely facing substantially flat faces of the silicon wafer for determining a thickness of the silicon wafer; and
      a slider body coupled to the first of the oppositely facing substantially flat faces to the silicon wafer.

19. The disk drive system of claim 18 further comprising a low temperature bonding material bonding the silicon wafer to the slider body.

20. The disk drive system of claim 19 wherein the bonding material is spun on the silicon wafer or the slider body.

21. The disk drive system of claim 19 wherein the bonding material comprises an epoxy.

22. The disk drive system of claim 19 wherein the bonding material comprises polymethyl methracrylate.

23. The disk drive system of claim 18 wherein the device comprises an electrostatic discharge protection device.

24. The disk drive system of claim 18 wherein the device comprises a magneto-resistive element.

25. The disk drive system of claim 18 wherein the at least one etch stop comprises a hard, polish-resistant material.

26. The disk drive system of claim 25 wherein the hard, polish-resistant material comprises tungsten.

27. The disk drive system of claim 25 wherein the hard, polish-resistant material comprises tantalum.

28. The disk drive of claim 25 wherein the hard, polish-resistant material comprises carbon.

29. The disk drive system of claim 18 wherein the at least one etch stop provides a measurement of the amount of silicon removed prior to coupling the slider body to the silicon wafer.

30. The disk drive system of claim 18 wherein the at least one etch stop has a depth, the depth being determined by proving the at least one etch stop during polishing to determine the resistance of the at least one etch stop and continuing to polish the silicon wafer until the at least one etch stop has a predetermined resistance.

31. The disk drive system of claim 18 wherein the at least one etch stop has a depth, the depth being determined by proving the at least one etch stop during polishing to determine the resistance of the at least one etch stop and continuing to polish the silicon wafer until the at least one etch stop has a predetermined thickness.

32. The disk drive system of claim 18 further comprising a deformable layer formed over the first of the oppositely facing substantially flat faces of the silicon wafer prior to bonding the silicon wafer to the slider body.

33. The disk drive system of claim 32 wherein the deformable layer is selectably excitable to cause the deformable layer to deform, the expansion torqueing the silicon wafer and devices toward the disk.

34. The disk drive system of claim 33 wherein the deformable layer provides a high average fly height for the head and reduces the fly height to near contact when a device is activated.

* * * * *